(12) United States Patent
Kass et al.

(10) Patent No.: US 8,760,466 B1
(45) Date of Patent: Jun. 24, 2014

(54) COHERENT NOISE FOR NON-PHOTOREALISTIC RENDERING

(75) Inventors: Michael Kass, Berkeley, CA (US); Davide Pesare, San Francisco, CA (US)

(73) Assignee: Pixar, Emeryville, CA (US)

( * ) Notice: Subject to any disclaimer, the term of this patent is extended or adjusted under 35 U.S.C. 154(b) by 650 days.

(21) Appl. No.: 12/854,059

(22) Filed: Aug. 10, 2010

Related U.S. Application Data

(60) Provisional application No. 61/295,981, filed on Jan. 18, 2010.

(51) Int. Cl.
*G09G 5/00* (2006.01)

(52) U.S. Cl.
USPC .......................................................... 345/611

(58) Field of Classification Search
USPC .......................................................... 345/611
See application file for complete search history.

(56) References Cited

U.S. PATENT DOCUMENTS

| | | | | |
|---|---|---|---|---|
| 4,064,530 | A * | 12/1977 | Kaiser et al. | 348/621 |
| 4,639,784 | A * | 1/1987 | Fling | 348/620 |
| 4,646,138 | A * | 2/1987 | Willis | 348/621 |
| 5,185,664 | A * | 2/1993 | Darby | 348/620 |
| 5,499,057 | A * | 3/1996 | Kondo et al. | 348/607 |
| 5,500,685 | A * | 3/1996 | Kokaram | 348/620 |
| 5,612,752 | A * | 3/1997 | Wischermann | 348/701 |
| 6,987,884 | B2 * | 1/2006 | Kondo et al. | 382/190 |
| 2003/0156301 | A1 * | 8/2003 | Kempf et al. | 358/486 |
| 2005/0122433 | A1 * | 6/2005 | Satou et al. | 348/701 |
| 2005/0280739 | A1 * | 12/2005 | Lin et al. | 348/607 |
| 2006/0023794 | A1 * | 2/2006 | Wan et al. | 375/240.29 |
| 2006/0139494 | A1 * | 6/2006 | Zhou et al. | 348/607 |
| 2006/0221253 | A1 * | 10/2006 | Kai et al. | 348/701 |
| 2007/0110303 | A1 * | 5/2007 | Bhattacharjya et al. | 382/166 |
| 2007/0236610 | A1 * | 10/2007 | Zhou et al. | 348/701 |
| 2008/0112610 | A1 * | 5/2008 | Israelsen et al. | 382/154 |
| 2011/0261427 | A1 * | 10/2011 | Hart et al. | 359/22 |

OTHER PUBLICATIONS

Baker, et al. 2007. "A database and Evaluation Methodology for Optical Flow," In Proc. ICCV '07. 8 pgs.
Barash, et al. 2004. "A Common Frame Work for Nonlinear Diffusion, Adaptive Smoothing, Bilateral Filtering and Mean Shift," Image and Vision Computing 22, pp. 1-15.
Comaniciu, et al. 2002. "Mean Shift: A Robust Approach Toward Feature Space Analysis," IEEE Trans. Pattern Anal. Mach. Intel. 24, 5, pp. 1-37.
Cook, et al. 2005. "Wavelet noise," ACM Trans. Graph. 24, 3, 803-811.
Decarlo, et al. 2002. "Stylization and Abstraction of Photographs," In Proc. SIGGRAPH '02, pp. 1-8.
Durand, et al. 2002. "Fast Bilateral Filtering for the Display of High-Dynamic-Range Images," In Proc. SIGGRAPH '02, 10 pgs.

(Continued)

*Primary Examiner* — Xiao Wu
*Assistant Examiner* — Hoai Le
(74) *Attorney, Agent, or Firm* — Patterson & Sheridan, LLP

(57) ABSTRACT

A method for generating two-dimensional image space noise. The method includes receiving a first frame of a rendered animation sequence; receiving a second frame of the rendered animation sequence; and generating a frame of noise that is associated with at least one object moving between the first frame and the second frame and is to be applied to the second frame, where generating the frame of noise comprises applying, for each pixel in the second frame, a causal filter based on a depth associated with the pixel and a velocity associated with the pixel.

20 Claims, 4 Drawing Sheets

(56) References Cited

OTHER PUBLICATIONS

Farbman, et al. 2008. "Edge-Preserving Decompositions for Multi-Scale Tone and Detail Manipulation," ACM Trans. Graph. 27, 3. 10 pgs.
Haralick, et al. 1987. "Image Analysis Using Mathematical Morphology," PAMI 9, 4 (July), 532-550.
Hays, et al. 2004. "Image and Video-Based Painterly Animation," In Proc. NPAR '04, 113-120.
Hertzmann, et al. 2000. "Painterly Rendering for Video and Interaction," In Proceeding of NPAR 2000, 7-12.
Hertzmann, A. 2003. "A Survey of Stroke-Based Rendering," Computer Graphics & Applications, Special Issue on Non-Photorealistic Rendering 23, 4 (July/August), 70-81.
Wang, et al. 2004. "Video Tooning," ACM Trans. on Graphics (Proc. SIGGRAPH 2004) 23, 3, 574-583.
Kass, et al. 1987. "Analyzing Oriented Patterns," Computer Vision Graphics and Image Processing 37, 3, 362-385.
Lagae, et al. 2009. "Procedural Noise Using Sparse Gabor Convolution," In SIGGRAPH '09: ACM SIGGRAPH 2009 papers, 1-10.
Litwinowicz, P. 1997. "Processing Images and Video for an Impressionist Effect," In Proc. SIGGRAPH '97, 407-415.
Meier, B. J. 1996. "Painterly Rendering for Animation," In Proc. SIGGRAPH '96, ACM, New York, NY, USA, 477-484.
Paris, et al. 2004. "Capture of Hair Geometry From Multiple Images," ACM Trans. Graph. (SIGGRAPH '04) 23, 3, 712-719.
Paris, S. 2008. "Edge-Preserving Smoothing and Mean-Shift Segmentation of Video Streams," In Proc. European Conference on Computer Vision (ECCV '08), 14 pgs.
Park, et al. 2008. "Painterly Animation Using Motion Maps," Graph. Models 70, 1-2, 1-15.
Peachey, D. R. 1985. "Solid Texturing of Complex Surfaces," In SIGGRAPH, 279-286.
Perlin, K. 1985. "An image synthesizer," In SIGGRAPH, 287-296.
Perona, et al. 1990. "Scale-Space and Edge Detection Using Anisotropic Diffusion," IEEE Trans. PAMI 12, 7, 629-639.
Teece, D. 2003. "Sable: A Painterly Renderer for Film Animation," In SIGGRAPH '03: ACM SIGGRAPH 2003 Sketches & Applications.
Tumblin, et al. 1999. "LCIS: A Boundary Hierarchy for Detail-Preserving Contrast Reduction," In Proc. SIGGRAPH '99, 83-90.
Winnemoller, et al. 2006. "Real-Time Video Abstraction," ACM Transactions on Graphics 25, 3 (July), 1221-1226.
Bousseau, et al. "Video Watercolorization Using Bidirectional Texture Advection," ACM Transaction on Graphics (Proceedings of SIGGRAPH 2007), vol. 26, No. 3—2007.

* cited by examiner

COHERENT NOISE FOR NON-PHOTOREALISTIC RENDERING

CROSS-REFERENCE TO RELATED APPLICATIONS

This application claims benefit of U.S. provisional patent application Ser. No. 61/295,981 filed on Jan. 18, 2010, which is hereby incorporated herein by reference.

BACKGROUND

1. Field of the Invention

The present invention relates to the field of computer animation and, in particular, to a system and method for coherent noise for non-photorealistic rendering.

2. Description of the Related Art

A wide variety of non-photorealistic rendering techniques make use of random variation in the placement or appearance of primitives. However, many conventional techniques suffer from the "shower-door" effect—the illusion that the random variation exists on a piece of glass through which the scene is being viewed.

Two different conventional techniques have been used to avoid the shower-door effect. Using a first conventional approach, primitives of the non-photorealistic rendering are generated in three-dimensions (3D) and attached to specific geometry. However, if the primitives are placed on 3D objects, then their spacing in the image plane will depend on the distance to the observer, the perspective transformation, and the field of view. If any of these parameters change, so will the rendering. It is difficult to disguise this to an observer. The appearance reflects the computation: it generally looks like the strokes or other rendering primitives exist on the surface of 3D objects instead of representing a unified 2D rendering in the image plane in the style of a traditional artist.

Using a second conventional approach, primitives of the non-photorealistic rendering are generated in 2D and moved according to an optic flow. These approaches also suffer from various limitations. The main problem is that computing optic flow from an image sequence is fundamentally under-constrained and hard to resolve. Examples of problems that occur are textureless regions, motion discontinuities, occlusions, large motions, small objects, non-rigid motion, mixed pixels, changes in illumination, non-Lambertian reflectance, motion blur, and camera noise, among others. Inaccuracies in the optic flow field can result in very unsatisfactory results.

As the foregoing illustrates, there is a need in the art for an improved technique that addresses the limitations of current approaches set forth above.

SUMMARY

Embodiments of the invention present coherent noise tailored to create a unified two-dimensional (2D) look. Embodiments of the invention compute the coherent noise using the depth and velocity field of a source sequence. Suitable filtering of the detail layer can provide the needed random variation with coherent motion.

One embodiment of the invention provides a method for generating two-dimensional image space noise. The method includes receiving a first frame of a rendered animation sequence; receiving a second frame of the rendered animation sequence; and generating a frame of noise that is associated with at least one object moving between the first frame and the second frame and is to be applied to the second frame, where generating the frame of noise comprises applying, for each pixel in the second frame, a causal filter based on a depth associated with the pixel and a velocity associated with the pixel.

Another embodiment of the invention provides a method for generating two-dimensional image space noise. The method includes generating an animation sequence by applying a filter to the animation sequence, wherein the filter operates on a noise field defined over space and time, and wherein filter parameters associated with the filter are responsive to a velocity component of one or more underlying objects and occlusion relationships to alter the rendering of the animation sequence.

One advantage is the embodiments of the invention add noise to non-photorealistic animation and avoid the shower-door effect. Another advantage is that embodiments of the invention can be used in some generality, without regard to viewpoint, size, or parameterization. Yet another advantage is that the techniques are not computationally intensive by the standards of 3D computer graphics, as each relies only on 2D image processing operations, e.g., the technique does not requires any per-object authoring effort.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention present coherent noise tailored to create a unified two-dimensional (2D) look. Embodiments of the invention compute the coherent noise using the depth and velocity field of a source sequence. Suitable filtering of the detail layer can provide the needed random variation with coherent motion.

Hardware Overview

Figure 1:
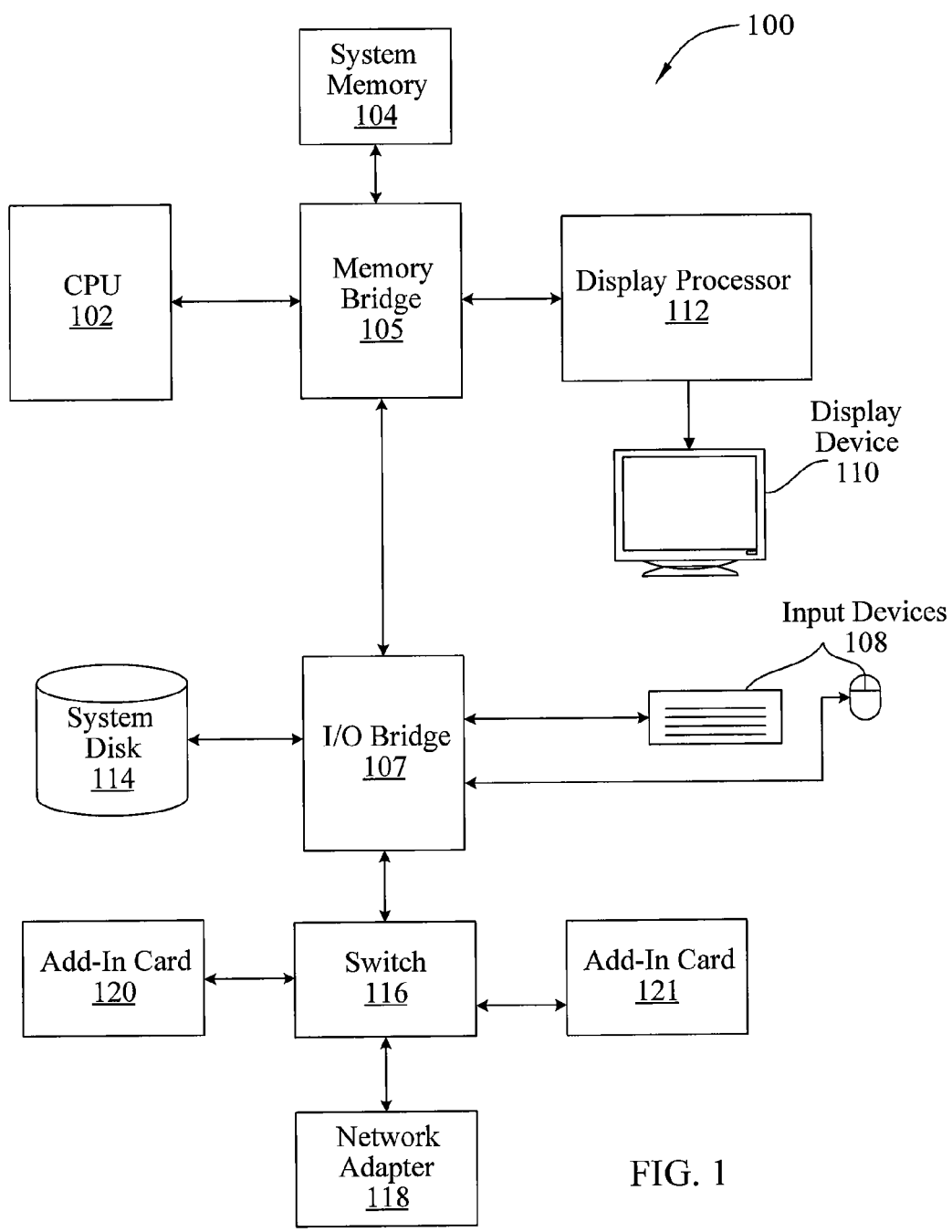
FIG. 1 is a block diagram of a system configured to implement one or more aspects of the invention.

FIG. 1 depicts one architecture of a system 100 within which embodiments of the present invention may be implemented. This figure in no way limits or is intended to limit the scope of the present invention.

System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-B), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular, components shown herein are optional; for instance, any number of add-in cards or peripheral devices might be supported. In some embodiments, switch 116 is eliminated, and network adapter 118 and add-in cards 120, 121 connect directly to I/O bridge 107.

Coherent Noise

Embodiments of the invention present coherent noise tailored to create a unified two-dimensional (2D) look. In order to create a unified two-dimensional (2D) look, it is useful for the variation to have controllable 2D spectral properties. Embodiments of the invention present coherent noise tailored for this purpose by computing the coherent noise using the depth and velocity field of a source sequence.

According to one embodiment of the invention, we begin with a rendered depth and velocity field. Embodiments of the invention then take a block of white noise as a function of (x, y, t) and filter the block, taking into account the depth and velocity fields and their consequent occlusion relationships. The result is what we call a coherent noise field. Each frame of the coherent noise field looks like independent white noise, but the variation from frame to frame is consistent with the movement in the scene. The resulting noise can be queried by non-photorealistic rendering algorithms to create random variation with uniform image-plane spatial properties that, nonetheless, appear firmly attached to the 2D projections of the three-dimensional (3D) objects.

Figure 2:
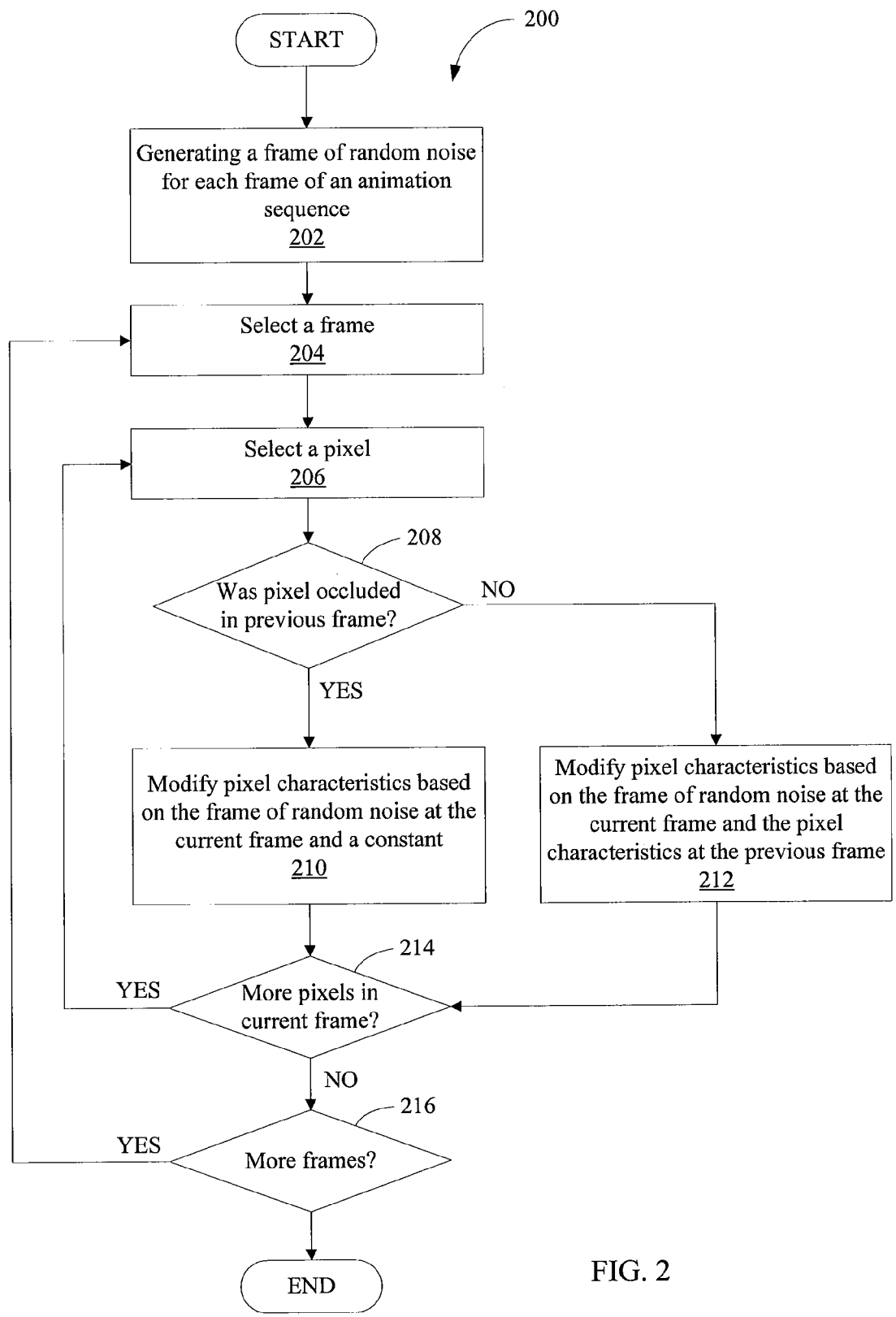
FIG. 2 is a flow diagram of method steps for applying coherent noise to an animation sequence, according to one embodiment of the invention.

FIG. 2 is a flow diagram of method steps for applying coherent noise to an animation sequence, according to one embodiment of the invention. Persons skilled in the art will understand that, even though the method 200 is described in conjunction with the systems of FIG. 1, any system configured to perform the method steps, in any order, is within the scope of embodiments of the invention.

As shown, the method 200 begins at step 202, a software application, such as a rendering application, generates a frame of random noise $w_i(x,y)$ for each frame i, $1 \leq i \leq n$ in an animation sequence, where x any correspond to the two-dimensional coordinates of a pixel in the frame. The frames of random noise can be generated using any technically feasible technique, such as by generating the random noise based on a seed value associated with each frame i.

At step 204, the software application selects a frame in the animation sequence. For example, the first frame of the sequence may be selected. At step 206, the software application selects a pixel in the selected frame.

At step 208, the software application determines whether the selected pixel is occluded in the previous frame. If the software application determines that the selected pixel is occluded in the previous frame, then the method 200 proceeds to step 210. In one embodiment, if the selected frame is the first frame in the animation sequence (i.e., there is no previous frame), then the method 200 also proceeds to step 210. If the software application determines that the selected pixel is not occluded in the previous frame, then the method 200 proceeds to step 212.

Typical synthetic 3D computer graphics applications are able to extract additional information at each pixel besides the rendered color vector. In particular, let us assume that the depth $z_i(x,y)$ and the 3D velocity vector $V_i(x,y)$ are available for each frame i, $1 \leq i \leq n$ in a given shot. As a practical matter, this information is available from popular commercial renderers like RenderMan® from Pixar® or Mental Ray® from Mental Images®. The goal is to use the information to create a coherent noise field $c_i(x,y)$ with stationary statistics in each frame, but with correlations between frames that match the motion of the scene.

The software application is able to determine that the frontmost surface at the selected pixel (x,y) had depth $z_i(x,y)$ and velocity $V_i(x,y)$ at frame i. Knowing the time interval $\Delta t$ between frames, the software application can estimate the 3D position of that surface point at the previous frame: $(x',y',z')$ $=(x,y,z)-\Delta t\, V_i(x,y)$. The software application then looks at the depth $z_{i-1}(x',y')$ and compares the depth to z'. If z' is farther away from the viewer than $z_{i-1}(x',y')$ by at least some threshold amount s, the software application concludes that the surface point was previously occluded by a closer surface at frame i−1. Otherwise, the software application concludes that the point was previously visible. Note that since (x',y') are not necessarily integer, computing $z_{i-1}(x',y')$ may require interpolation. In some embodiments, the software application uses bilinear interpolation for this purpose.

Based on the determination at step 208 of whether the pixel was occluded at the previous frame, the software application creates the necessary correlations by filtering the noise from frame to frame, as described in greater detail below. In order to do the low-pass filtering efficiently, some embodiments use a causal filter that depends only on past and present inputs. Any recursive filter suffices for this purpose. An example of such a causal filter is a discrete time recursive filter. In one example, if the input to the filter is $f_i$ and the output of the filter is $g_i$, a first-order recursive filter can be written as:

$$g_i = \alpha g_{i-1} + (1-\alpha)f_i \qquad \text{(Equation 1)},$$

where $\alpha$ controls the exponential rate of decay of the filter's impulse response $$h_i = \begin{cases} (1-\alpha)\alpha^i & i \geq 0 \\ 0 & \text{otherwise.} \end{cases} \qquad \text{(Equation 2)}$$

In order to create coherent noise that is easy to use, embodiments of the invention ensure that the output of the filter is stationary, i.e., that filter's statistics do not depend on the frame number i. Embodiments of the invention achieve this result by setting appropriate conditions on $g_0$, which is left unspecified by the recursion in Equation 1.

In some embodiments, the quantity corresponding to $f_i$ that is being filtered is independent, identically distributed noise. Thus, embodiments of the invention can write the variance of each side of Equation 1 as follows:

$$\sigma^2(g_i) = \alpha^2 \sigma^2(g_{i-1}) + (1-\alpha)^2 \sigma^2(f) \qquad \text{(Equation 3)}.$$

The condition we would like is $\sigma^2(g_i) = \sigma^2(g_{i-1})$, which implies $$\sigma^2(g) = \alpha^2 \sigma^2(g) + (1-\alpha)^2 \sigma^2(f) \qquad \text{(Equation 4)}.$$

Some simple algebra yields:

$$\sigma^2(g) = \left(\frac{1-\alpha}{1+\alpha}\right)\sigma^2(f), \qquad \text{(Equation 5)}$$

which gives us the necessary condition for stationarity, $$g_0 = \sqrt{\frac{1-\alpha}{1+\alpha}} f_0 = k(\alpha) f_0. \qquad \text{(Equation 6)}$$

Substitution back into Equation 3 shows that the condition is also sufficient.

Having determined the condition for stationarity, we can return to our goal of filtering white noise images $w_i(x,y)$ into coherent noise $c_i(x,y)$. Initially, i.e., for the first frame of the animation sequence, embodiments of the invention set $c_0(x,y) = k(\alpha)w_0(x,y)$ for each pixel (x,y). Then we compute $c_i(x,y)$ from $c_{i-1}(x,y)$ as follows based on whether the selected pixel is occluded in the previous frame.

Having determined whether the surface point at (x,y) was previously occluded or not, we compute $c_i(x,y)$ as follows:

$$c_i(x, y) = \begin{cases} k(\alpha)w_i(x, y) & \text{occlusion} \\ \alpha c_{i-1}(x', y') + (1 - \alpha)w_i(x, y) & \text{otherwise.} \end{cases} \quad \text{(Equation 7)}$$

In some embodiments, $c_{i-1}(x',y')$ is computed using bilinear interpolation. Accordingly, when the point on the surface of an object in the previous frame corresponding to the pixel in the current frame is occluded in the previous frame, at step 210, the software application modifies the pixel characteristics based on the frame of random noise at the current frame and a constant $k(\alpha)$. Examples of pixel characteristics that may be modified according to embodiments of the invention include color values and intensity values, among others.

When the point on the surface of an object in the previous frame corresponding to the pixel in the current frame is not occluded in the previous frame, at step 212, the software application modifies the pixel characteristics based on the frame of random noise at the current frame and the pixel characteristics at the previous frame. In some embodiments, the value of $\alpha$ is close to 1.0, e.g., 0.98. Thus, in these embodiments, a majority of the value $c_i$ for not occluded pixels is based on the value of $c_{i-1}$, with only a small fraction of the value of $c_i$ being based on the random noise value associated with the pixel in the current frame.

At step 214, the software application determines whether more pixels in the current frame are left to be processed. In some embodiments, the above algorithmic steps can be applied to each pixel in a frame. If the software application determines that more pixels in the current frame are left to be processed, then the method 200 returns to step 206, described above. If the software application determines that no more pixels in the current frame are left to be processed, then the method 200 proceeds to step 216.

At step 216, the software application determines whether more frames in the animation sequence are left to be processed. In some embodiments, the above algorithmic steps can be applied to each frame in the animation sequence. If the software application determines that more frames in the animation sequence are left to be processed, then the method 200 returns to step 204, described above. If the software application determines that no more frames in the animation sequence are left to be processed, then the method 200 terminates.

After implementing the method 200 described above for a particular animation sequence, the resulting $c_i(x,y)$ has many desirable properties, but the filter is asymmetric in time, and hence the result is not entirely stationary. To solve this problem and to create better stationarity, embodiments of the invention can do the filtering forward and backwards in time, as described below in FIG. 3.

Figure 3:
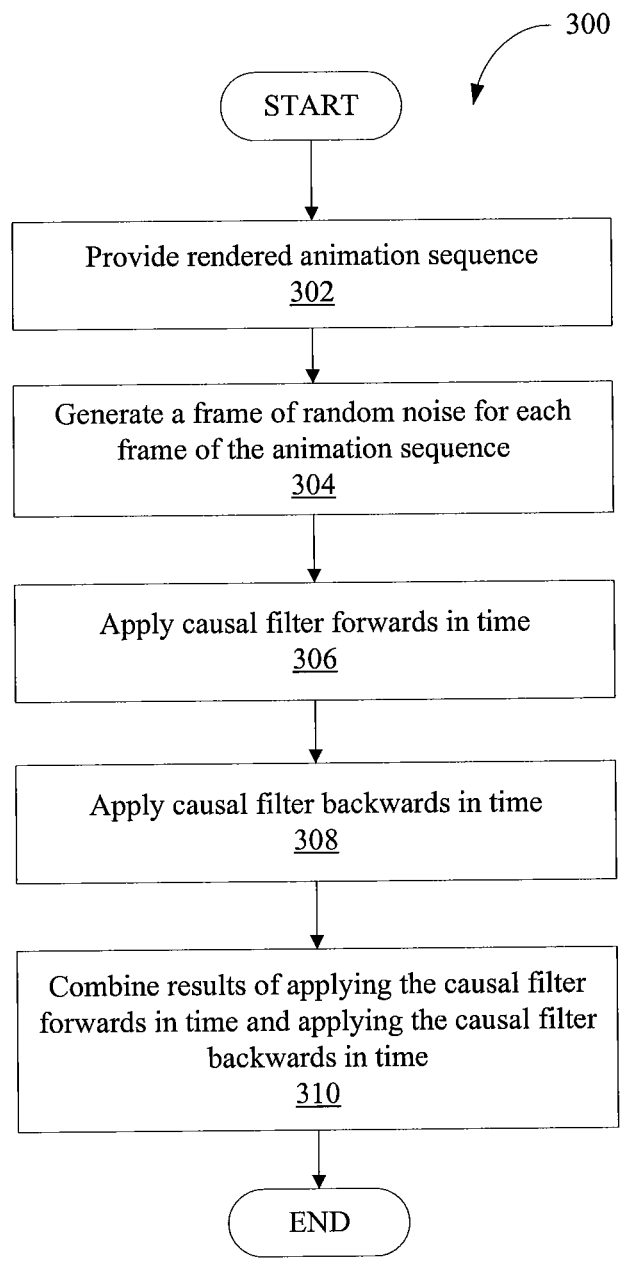
FIG. 3 is a flow diagram of method steps for applying coherent noise forwards in time and backwards in time, according to one embodiment of the invention.

FIG. 3 is a flow diagram of method steps for applying coherent noise forwards in time and backwards in time, according to one embodiment of the invention. Persons skilled in the art will understand that, even though the method 300 is described in conjunction with the systems of FIG. 1, any system configured to perform the method steps, in any order, is within the scope of embodiments of the invention.

As shown, the method 300 begins at step 302, where a software application provides a rendered animation sequence. In some embodiments, the animation sequence may be already rendered and provided to the software application.

At step 304, the software application generates a frame of random noise for each frame in the animation sequence. In some embodiments, step 304 is substantially similar to step 202 described above in FIG. 2.

At step 306, the software application applies a causal filter forwards in time. In some embodiments, applying the causal filter forwards in time comprises performing the method 200 described in FIG. 2 beginning at the first frame of the animation sequence and ending with the last frame of the animation sequence.

At step 308, the software application applies a causal filter backwards in time. In some embodiments, applying the causal filter backwards in time comprises performing the method 200 described in FIG. 2 beginning at the last frame of the animation sequence and ending with the first frame of the animation sequence. In one embodiment, when applying the causal filter backwards in time, the software application determines, for each pixel in a given frame, whether the pixel was occluded at the next or subsequent frame. If, for example, embodiments of the invention took the output of the forward filtering and then filtered it backwards, then the input would no longer be uncorrelated white noise, and the previous conditions for stationarity would not hold. Instead, embodiments of the invention separately filter the same white noise forwards and backwards in time.

At step 310, the software application combines the results of applying the causal filter forwards in time and applying the causal filter backwards in time. In some embodiments, combining the results of applying the causal filter forwards and backwards in time requires certain "double counting" to be subtracted away.

For example, let $c_i(x,y)$ be the result of filtering $w_i(x,y)$ forwards, and let $\bar{c}_i(x,y)$ be the result of the same process done with time reversed, starting at frame n and ending at frame i. Then, the sum double counts at the center of its impulse response.

If we use the recursive filter of Equation 1 forwards and backwards in time, $$g_i = \alpha \bar{g}_{i-1} + (1-\alpha)f_i \quad \text{(Equation 8)}$$
$$\bar{g}_{i-1} = \alpha g_i + (1-\alpha)f_{i-1},$$

then the sum has impulse response:

$$h_i = \begin{cases} (1-\alpha)\alpha^i & i \neq 0 \\ 2(1-\alpha) & i \neq 0 \end{cases} \quad \text{(Equation 9)}$$

because the impulse responses of the forwards and backwards filters overlap at offset zero. The result is a poor low-pass filter. To fix this, embodiments of the invention simply subtract $(1-\alpha)f_i$ from the sum, producing a filter with impulse response:

$$h_i = (1-\alpha)\alpha^{|i|}. \quad \text{(Equation 10)}$$

In some embodiments, the full algorithm uses the computation forwards in time to compute $c_i(x,y)$ and then repeats the computation backwards in time to compute $\bar{c}_i(x,y)$. Finally, the result is given by:

$$C_i(x,y) = \bar{c}_i(x,y) + \underline{c}_i(x,y) - (1-\alpha)w_i(x,y). \quad \text{(Equation 11)}$$

Control over the spectrum of C is a relatively simple matter. Instead of white noise $w_i(x,y)$, embodiments of the invention substitute noise with any chosen spatial spectrum as the input to the recursive filtering. As long as the individual frames of noise are independent from one another, the same conditions for stationarity of the variance will still hold. If we want some continuity across object boundaries, some embodiments of the invention can also apply a small amount of spatial smoothing of C after computing it from Equation 11.

FIGS. 4A-4D are conceptual diagrams that illustrate applying coherent noise to an object in an animation sequence, according to one embodiment of the invention. In some embodiments, a small amount of Gaussian smoothing can be applied to the input noise and a small amount of Gaussian smoothing can be applied to C. The filtering process can be repeated independently for each color channel. As described, in some embodiments, the value of α is close to 1.0, e.g., 0.98.

Figure 4A:
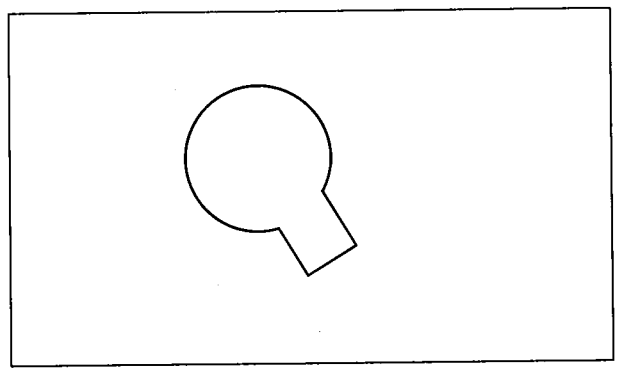
FIGS. 4A-4D are conceptual diagrams that illustrate applying coherent noise to an object in an animation sequence, according to one embodiment of the invention.
Figure 4B:
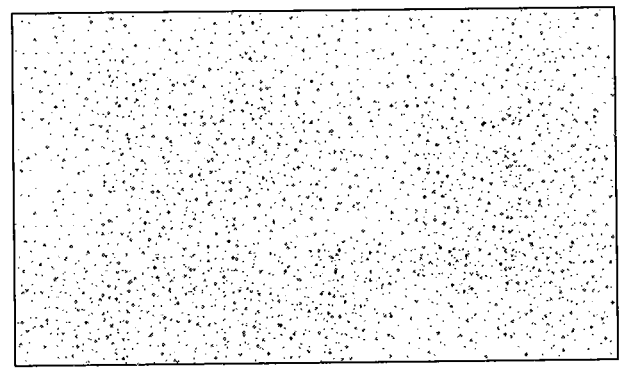
Figure 4C:
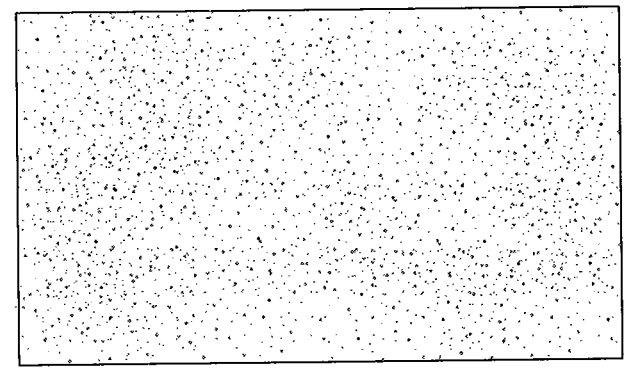
Figure 4D:
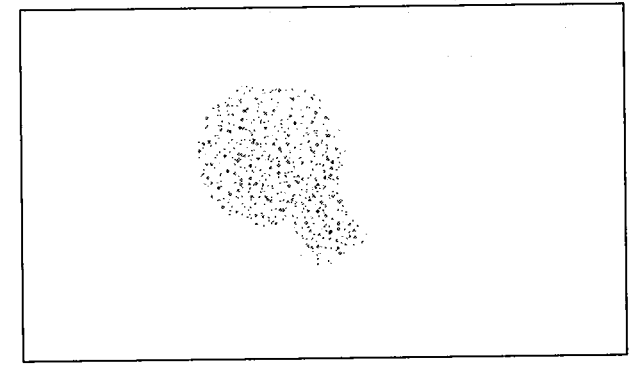

A frame from the original animation sequence is shown in FIG. 4A and includes an object. The images in FIGS. 4B and 4C are two frames from the coherent noise computed for this shot, i.e., at step 202. On casual inspection, the images in FIGS. 4B and 4C appear to be unrelated noise. Subtracting them, however, yields the image in FIG. 4D, which clearly shows the time-coherent structure and reveals the object. If the above techniques were to be applied to a sequence of animation, playing back just the coherent noise C, the three-dimensional shapes in the original animation are clearly evident despite the fact that each frame by itself lacks any 3D structure.

In sum, embodiments of the invention present coherent noise tailored to create a unified two-dimensional (2D) look. Embodiments of the invention compute the coherent noise using the depth and velocity field of a source sequence. Suitable filtering of the detail layer can provide the needed random variation with coherent motion.

One advantage is the embodiments of the invention add noise to non-photorealistic animation and avoid the shower-door effect. Another advantage is that embodiments of the invention can be used in some generality, without regard to viewpoint, size, or parameterization. Yet another advantage is that the techniques are not computationally intensive by the standards of 3D computer graphics, as each relies only on 2D image processing operations, e.g., the technique does not requires any per-object authoring effort.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for generating two-dimensional image space noise, comprising:
   receiving a first frame of a rendered animation sequence;
   receiving a second frame of the rendered animation sequence;
   generating, by operation of one or more computer processors, a frame of noise by selectively applying, for each pixel in the second frame, a causal filter based on a depth associated with the pixel, a velocity associated with the pixel, and a determination of whether the pixel is occluded in the first frame of the rendered animation sequence, wherein the frame of noise is associated with at least one object moving between the first frame and the second frame; and
   applying the generated frame of noise to the second frame of the rendered animation sequence to selectively introduce noise into the second frame.

2. The method of claim 1, wherein generating the frame of noise is repeated for each frame in the rendered animation sequence.

3. The method of claim 1, wherein the causal filter comprises a recursive filter.

4. The method of claim 3, wherein generating the frame of noise further comprises:
   for a second pixel in the second frame, selecting a parameter of the recursive filter based on a determination of whether a point on a surface of a first object is occluded in the first frame, wherein the point on the surface of the first object corresponds to the second pixel in the second frame.

5. The method of claim 4, wherein the determination of whether the point on the surface of the first object is occluded in the first frame further comprises:
   determining a depth of the point by extrapolating a three-dimensional position of the point based on the depth and velocity associated with the pixel in the second frame; and
   determining, based on the determined depth, whether the point is occluded in the first frame.

6. The method of claim 5, further comprising:
   upon determining that the point on the surface of the object is occluded in the first frame, modifying one or more characteristics of the second pixel in the second frame based on a frame of random noise associated with the second frame and a constant value; and
   upon determining that the point on the surface of the object is not occluded in the first frame, modifying one or more characteristics of the second pixel in the second frame based on the frame of random noise and one or more characteristics of the point on the surface of the object in the first frame.

7. The method of claim 1, wherein the causal filter is applied forward in time beginning with the first frame of the rendered animation sequence.

8. The method of claim 1, wherein the causal filter is applied backwards in time beginning with the last frame of the rendered animation sequence.

9. The method of claim 1, wherein applying the causal filter comprises applying the causal filter forward in time to generate first result data, applying the causal filter backwards in time to generate second result data, and combining the first result data and the second result data to generate final data.

10. A non-transitory computer-readable medium storing instructions that, when executed by a processor, cause a computer system to perform an operation for generating two-dimensional image space noise, the operation comprising:
   receiving a first frame of a rendered animation sequence;
   receiving a second frame of the rendered animation sequence;

generating a frame of noise by selectively applying, for each pixel in the second frame, a causal filter based on a depth associated with the pixel, a velocity associated with the pixel, and a determination of whether the pixel is occluded in the first frame of the rendered animation sequence, wherein the frame of noise is associated with at least one object moving between the first frame and the second frame; and applying the generated frame of noise to the second frame of the rendered animation sequence to selectively introduce noise into the second frame.

11. The non-transitory computer-readable medium of claim 10, wherein generating the frame of noise is repeated for each frame in the rendered animation sequence.

12. The non-transitory computer-readable medium of claim 10, wherein the causal filter comprises a recursive filter.

13. The non-transitory computer-readable medium of claim 12, wherein generating the frame of noise further comprises:

for a second pixel in the second frame, selecting a parameter of the recursive filter based on a determination of whether a point on a surface of a first object is occluded in the first frame, wherein the point on the surface of the first object corresponds to the second pixel in the second frame.

14. The non-transitory computer-readable medium of claim 13, wherein the determination of whether the point on the surface of the first object is occluded in the first frame further comprises:

determining a depth of the point by extrapolating a three-dimensional position of the point based on the depth and velocity associated with the pixel in the second frame; and determining, based on the determined depth, whether the point is occluded in the first frame.

15. The non-transitory computer-readable medium of claim 14, further comprising:

upon determining that the point on the surface of the object is occluded in the first frame, modifying one or more characteristics of the second pixel in the second frame based on a frame of random noise associated with the second frame and a constant value; and upon determining that the point on the surface of the object is not occluded in the first frame, modifying one or more characteristics of the second pixel in the second frame based on the frame of random noise and one or more characteristics of the point on the surface of the object in the first frame.

16. The non-transitory computer-readable medium of claim 10, wherein the causal filter is applied forward in time beginning with the first frame of the rendered animation sequence.

17. The non-transitory computer-readable medium of claim 10, wherein the causal filter is applied backwards in time beginning with the last frame of the rendered animation sequence.

18. The computer-readable storage medium of claim 10, wherein applying the causal filter comprises applying the causal filter forward in time to generate first result data, applying the causal filter backwards in time to generate second result data, and combining the first result data and the second result data to generate final data.

19. A computer system, comprising:

a processor; and a memory storing instructions that, when executed by the processor, cause the computer system to perform an operation for generating two-dimensional image space noise, the operation comprising:

receiving a first frame of a rendered animation sequence;

receiving a second frame of the rendered animation sequence;

generating a frame of noise by selectively applying, for each pixel in the second frame, a causal filter based on a depth associated with the pixel, a velocity associated with the pixel, and a determination of whether the pixel is occluded in the first frame of the rendered animation sequence, wherein the frame of noise is associated with at least one object moving between the first frame and the second frame; and applying the generated frame of noise to the second frame of the rendered animation sequence to selectively introduce noise into the second frame.

20. A method for generating two-dimensional image space noise, comprising:

selectively introducing noise into frames of an animation sequence by selectively applying a filter to the animation sequence, wherein the filter operates on a noise field defined over space and time, and wherein filter parameters associated with the filter are responsive to a velocity component of one or more underlying objects and occlusion relationships between the frames of the animation sequence to alter the rendering of the animation sequence.

* * * * *

UNITED STATES PATENT AND TRADEMARK OFFICE
CERTIFICATE OF CORRECTION

PATENT NO.           : 8,760,466 B1
APPLICATION NO.      : 12/854059
DATED                : June 24, 2014
INVENTOR(S)          : Kass et al.

Page 1 of 1

It is certified that error appears in the above-identified patent and that said Letters Patent is hereby corrected as shown below:

In the Specification

Column 3, Line 57, please delete "(PCI-B)" and insert --(PCI-E)-- therefor;

Column 5, Line 26, please delete "any" and insert --and y-- therefor;

Column 5, Line 64, please delete "s" and insert -- ε -- therefor.

Signed and Sealed this
Ninth Day of September, 2014

Michelle K. Lee
*Deputy Director of the United States Patent and Trademark Office*